March 1, 1960 — R. ARNAUD — 2,927,195
AUTOMATIC ARC WELDING APPARATUS
Filed March 27, 1956 — 7 Sheets-Sheet 1

Fig.1

INVENTOR
ROBERT ARNAUD
BY Young, Emery & Thompson
ATTYS

March 1, 1960     R. ARNAUD     2,927,195
AUTOMATIC ARC WELDING APPARATUS
Filed March 27, 1956     7 Sheets-Sheet 3

INVENTOR
ROBERT ARNAUD
BY Young, Emery & Thompson
ATTYS.

March 1, 1960 R. ARNAUD 2,927,195
AUTOMATIC ARC WELDING APPARATUS
Filed March 27, 1956 7 Sheets-Sheet 4

INVENTOR
ROBERT ARNAUD
BY Young, Emery & Thompson
ATTYS.

March 1, 1960   R. ARNAUD   2,927,195
AUTOMATIC ARC WELDING APPARATUS
Filed March 27, 1956   7 Sheets-Sheet 5

INVENTOR
ROBERT ARNAUD
BY Young, Emery & Thompson
ATTYS.

March 1, 1960  R. ARNAUD  2,927,195
AUTOMATIC ARC WELDING APPARATUS
Filed March 27, 1956  7 Sheets-Sheet 6

INVENTOR
ROBERT ARNAUD
BY Young, Emery & Thompson
ATTYS.

March 1, 1960     R. ARNAUD     2,927,195
AUTOMATIC ARC WELDING APPARATUS
Filed March 27, 1956     7 Sheets-Sheet 7

INVENTOR
ROBERT ARNAUD

United States Patent Office 2,927,195
Patented Mar. 1, 1960

2,927,195

AUTOMATIC ARC WELDING APPARATUS

Robert Arnaud, Boulogne-sur-Seine, France, assignor to l'Air Liquide, Societe Anonyme pour l'Etude et l'Exploitation des Procedes Georges Claude, Paris, France Application March 27, 1956, Serial No. 574,291

Claims priority, application France March 29, 1955

4 Claims. (Cl. 219—130)

The present invention concerns an automatic arc welding machine, intended, in particular for the entirely automatic welding of objects, the profiles of which, in the three dimensions of space, may be of any kind whatsoever.

The invention will be studied more particularly in its application to arc welding in an argon atmosphere with a non consumable electrode and a filler wire, and in the case when the weldment, of any contour whatsoever, rotates in front of a welding torch supported on a stationary frame. Other embodiments and other applications of the invention will also appear from the present description.

The machine according to the invention has, as a main purpose, to provide a considerable increase in the speed of arc welding in argon, particularly in mass production operations, by eliminating or decreasing as much as possible the unproductive periods, owing to an automatic determination, by the machine itself, of its chief variables of operation, which, heretofore, in known machines, had to be determined and adjusted manually by the operator. It has the more special purpose, of greatly facilitating and of making as rapid as possible the successive execution, on one part or on small series of parts, of welded joints of any contours, in particular along plane or skew curves or broken lines.

While the practice of argon-shielded arc welding lends itself very well to manual operation, it was found that its execution by means of an automatic machine offers great difficulties, because the operation is very sensitive to variations in the arc parameters and these react mutually, sometimes in a very complex manner. An operator, welding by hand, perceives fairly easily the degree of penetration of the weld pool and sees the advance of the bead he is carrying out. He may thus add more or less welding metal, using the arc as he would use a torch flame.

The applicant found that it is highly desirable, in argon-shielded arc welding, and particularly when this welding is carried out with a non consuming electrode and a filler wire fed to the weld pool, to control accurately the main arc parameters: arc length, welding current intensity, welding speed, and filler wire feed rate.

The precision of the arc length control should be high, of the order of half a millimeter, and this, in particular, because:

(1) The shape of the dropping characteristic of the current generators used, and that of the arc voltage versus arc length show that a small variation in the arc length reacts immediately on the current intensity and hence on the welding energy.

(2) The shape of the arc itself changes according to its length: a longer arc spreads more on the metal sheet to be welded and has a lesser penetration.

Thus the necessity of maintaining a constant arc length makes it imperative to use welding jigs of a high mechanical accuracy, the high cost of which, repeated with each new contour of the joint to be welded constitutes a hindering limitation for the commercial development of automatic welding processes.

The two parameters, welding current intensity and welding speed, must be balanced, for obtaining a regular penetration of the bead, which made it necessary, heretofore, previous to any welding operation, to proceed with preliminary adjustments on test metal sheets, then with corrections for passing from the test sample to the actual production piece. These pre-adjustments were all the more indispensable as the output indications on the current generators are conventional and therefore of poor accuracy for a given operation. They are affected, further, by other factors, such as the voltage drop at the arc.

It is desirable also to hold the welding current intensity constant during the welding operation, since the welding energy depends mainly on this intensity. This factor however, varies according to the irregularities in the mains voltage and to the fluctuations in the arc voltage. It is necessary also to maintain a constant speed of the motor which drives the part to be welded.

The use of a filler wire, which is often indispensable, makes the welding operation still more complex:

By using up part of the energy of the arc, and

By requiring an increased precision of the arc length, in order that the filler wire be kept always on the same point of impact.

It is desirable, therefore, to adjust successively the parameters acting on the arc length, the welding current intensity, the welding speed and the filler wire feed rate.

With known machines, the trial operations should be continued until a correct adjustment of these parameters is obtained. Once this adjustment has been reached, the problem remains of ensuring its stability.

When the parts to be welded are not plane, the necessary means must also be provided for ensuring a constant speed of the melted pool, for keeping the welding head constantly perpendicular to the weld plane, and for obtaining that the welding metal rod reaches the melted pool at a constant angle.

The parameters finally reach such a complexity that trying to control every one of them, is justified only for very large productions.

Account must also be taken of the mutual behaviour or interaction of the adjustment parameters; the voltage across the arc terminals varies with the length of said arc. This variation is not exactly proportional. Besides, there is an interaction between the welding energy and intensity. It may be assumed, indeed, that within a useful adjustment range, the power is represented by the product of the cathode voltage drop in the arc by the current. Consequently, for a given operation, the power is directly proportional to the current and the energy is inversely proportional to the welding speed.

As regards the mutual action of the voltage and current it was seen just now, that the arc length is related to the voltage. The voltage, in turn, is related to the current due to the fact that the usual welding current generators have a dropping voltage-current characteristic. It follows that if it is impossible to keep a strictly constant arc length, a variation of one millimeter will vary the voltage by 0.5 volt and will change the current by 3 amperes, assuming the welding to be carried out with a direct current of 150 amperes supplied by a rotary generator.

It should also be recalled that in alternating current welding, account should be taken of asymmetries in shape, chemical composition, emissive power and temperature between the starting points of the arc. These asymmetries are reflected in the shapes of the half waves of voltage and current in the welding circuit. One object of the invention is to make it possible to weld in an argon atmosphere, in alternating current as well as with direct current, when the nature of the operation leads to choosing alternating current.

Generally speaking the object of the present invention, is to meet, separately or, preferably simultaneously, a number of requirements which, in particular, are as follows:

(1) Keep the arc length constant, with as close a tolerance as possible, for instance of the order of 0.1 mm.;

(2) Carry out successively joints of different profiles, by obtaining that the machine itself adapt the travel speed of the weldpiece or of the torch, as the case may be, so that the welding speed remain the same, for any of the following kinds of weldments:

(a) Joints with a circular contour, the radius being variable from one joint to the next;
(b) Joints of any plane contour;
(c) Joints of any skew contour;
(d) Operations carried out at a variable travel speed.

Thus in the case of welding along a skew curve, the purpose of the invention is to keep constant the resultant of the tangential, normal and transverse speeds of the torch with respect to the weld pool.

(3) Maintain a constant angle between the torch and the weld pool;

(4) Keep the weld pool constantly horizontal;

(5) Keep the characteristics of the welded joint constant, in particular the penetration, in spite of the fluctuations in the welding current and more generally, to set up and maintain a constant value of the electrical welding energy involved per unit length of welded joint;

(6) Ensure a constant penetration, in spite of irregularities in the preparation of the joint;

(7) In case of welding with filler metal, to establish and maintain a constant relationship between the welding current intensity and the filler wire feed rate;

(8) Ensure the rapidity of response and the stability of the servo-mechanisms involved in the various functions listed above;

(9) Ensure automatically the succession, at the desired intervals, of the various steps in a welding operation.

Amongst the problems just listed, a number are conventional, for instance that of maintaining a constant arc length. The machine according to the present invention brings to these problems, new and advantageous solutions by putting in application means, chiefly of an electric nature, which had never been used heretofore in the technique of automatic welding. On the other hand, there are other problems, amongst those which have just been listed, which do not seem to have retained the attention of technicians, heretofore, so that their investigation opens an entirely new field. This is the case, in particular, for the welding at a constant linear energy and constant penetration, an outline of which has been given at the beginning and which will be examined in greater detail hereinafter.

The present invention brings to these problems quite a general solution, which is essentially characterized by a combination of automatic means for keeping the arc voltage constant and for relating the speed of welding, as well as, if necessary, the filler wire feed rate with the intensity of the welding current, this combination of means tending to keep constant the electrical energy applied to the weld per unit length of the welded joint.

The first problem which will be discussed hereinafter is the control, within very narrow limits, of a constant arc length.

Devices are known, which utilize the variations of the arc voltage for controlling the arc length. Some of these devices, which operate correctly in a helium atmosphere, do not give as good results in argon, because the variation of the voltage as a function of the arc length is substantially smaller in argon than in helium.

A further object of the present invention, is to control the arc length with a high precision, using, at will, direct current, in direct or reversed polarity as well as alternating current, by means of a simple switching device which will be described hereinafter.

Out of the known devices for controlling the arc length when welding with alternating current, some use, as a control voltage, the mean voltage of the negative half-waves; this arrangement offers the advantage of eliminating the effect of the positive half wave, which is irregular and of obtaining a stable value of the control voltage.

Now, considering the voltage oscillogram, it will be noted that a peak appears on the positive half wave of the electrode; the area limited by that peak being small, it becomes negligible if an integral of the areas is used, over an extended zone, for instance over several periods.

Automatic welding in an argon atmosphere with a non-consuming electrode requires a very regular power supply, a failure over a few half waves being always liable to cause irregular welding results.

Repeated observations show, by oscillograms related to practical results, that a power supply offering an almost absolute regularity in the shape of its voltage curve is necessary and may be obtained in the present state of the art, in the current regulation zone above 60 amperes.

According to a first feature of the present invention, the arc length control voltage is the mean value of the integral of the welding voltage over several periods, including positive and negative half waves.

To that effect, the machine according to the invention, comprises a resistance-capacity network to which the D.C. or rectified arc voltage is applied, for obtaining, by integration a voltage equal to the mean value of the effective arc voltage over a certain time (for instance over several periods in the case of alternating current) in combination with a circuit comparing that integrated voltage with a stabilized reference voltage, and a servo-mechanism controlled by the differential voltage supplied by the comparator circuit for moving the welding head towards or away from the weld pool.

One embodiment of this machine, for A.C. welding comprises a circuit connected to the arc terminals, through a condenser eliminating all D.C. components and a filter stopping extraneous currents, in particular the harmonics of the welding voltage, for delivery of a D.C. voltage proportional to the arc voltage, by rectifying both half waves, the rectified output voltage being applied, as above to an integrating network followed by a comparator circuit.

According to a second characteristic of the invention, the differential comparator-amplifier offers an operation threshold adjustable on either side of the reference voltage and it is connected to the motor which controls the up and down motions of the welding torch through a set of relays so arranged as to keep this motor braked, by short circuiting the armature through a resistance and leaving the field winding energized, so long as the variations in the arc voltage remain between the two adjustment thresholds chosen.

This arrangement prevents oscillations of the torch above and below the adjustment point, while allowing an excellent sensitivity of the regulation. It is thus possible to stabilize, within 50 millivolts an arc voltage of the order of 16 volts, corresponding to an arc length in argon of about 3 mm., this voltage remaining, for instance between 15.95 and 16.05 volts, and the torch remaining blocked as long as the difference between the actual arc voltage and the reference voltage remains less than 50 millivolts.

It should be noted that the voltage applied to the armature of the motor by means of the above device for moving the torch up or down, is always proportional to the difference between the arc voltage and the reference voltage and, thus, the speed with which the torch is brought back to its correct position increases like the difference between the actual arc length and the selected length. It may also be modified by adjusting the rate of amplification.

For maintaining a constant ratio between the current intensity and the welding speed on the one hand and the filler wire feed rate on the other hand, the machine according to the present invention is also characterized in that it comprises a measuring device, delivering, at any instant, a voltage which is always proportional to the welding current, and an amplifier controlled by said voltage for controlling the speed of the carriage travel motor in the case of a welding head mounted on a carriage, or of the motor driving the weldpiece in the case of a head on a fixed frame. The measuring element, in the case of a D.C. welding, may consist of a transducer and, for A.C. welding, it may be built in the manner of a current transformer. In addition, in accordance with a preferred embodiment of the invention, the same apparatus comprises a simple switching device by means of which it operates, at will, according to the nature of the current, D.C. or A.C. as a transducer or as a current transformer.

Preferably, the proportionality factor between the welding current and the welding speed or the rod feeding speed is adjustable, for instance by controlling the output of the transducer or of the current transformer by a potentiometer, or, better, by a variostat. One embodiment of the machine according to the invention comprises means for ensuring a constant penetration of the welding bead by varying the filler wire feed rate in an inverse ratio to the travel speed of the electrode on the surface of the weldpiece, these means comprising, for instance, a transducer delivering a voltage proportional to the welding current, and a double potentiometer determining, from this voltage, two voltages which vary in opposite directions and according to the variables of a linear equation and which are applied, respectively, to the wire feed motor and to the motor driving the torch carriage or the weldpiece, this device enabling the operator to adjust the filler wire supply independently of the rate of penetration and of the intensity of the welding current.

In order to ensure a constant welding speed, and consequently a constant linear welding energy, during the welding of joints having a circular shape, with various radii on a revolution part rotating about its axis, admitting that the arc voltage and current are already regulated, the machine according to the invention is also characterized in that it is provided with an electric device which automatically decreases the speed of rotation of the weldpiece when the radius increases, so as to keep a constant tangential speed. This device comprises, for instance, a potentiometer, operated by the upward motion of the torch, and offering such a hyperbolic resistance curve that the product of the radius of the joint by the angular speed of rotation of the work, i.e. the tangential speed, is held constant.

For the welding of joints of any plane pattern on a workpiece rotating about any axis, the machine according to the invention is characterized in that is comprises, in combination, means for keeping a constant speed of the weld pool, this speed being the resultant of the circumferential speed of the work and of the upward or downward speed of the torch, and means for keeping a constant angle between the torch and the weld pool, these means comprising, in particular:

(a) A first circuit by which a voltage proportional to the welding current is applied to a potentiometer for correcting the radius, in the manner just indicated for the welding of circular joints, then preferably through an impedance lowering amplifier to an angular correction potentiometer, the slide of which is driven by the motion of inclination of the torch, the voltage corrected by these two potentiometers being used for adjusting the speed of the motor which rotates the workpiece.

(b) A second circuit comprising a differential amplifier to which are applied, on the one hand, a voltage proportional to the armature voltage of the torch raising motor (i.e. a voltage which is proportional to the sine of the angle to be maintained between the torch and the weld pool) and, on the other hand, the output voltage of an angular position potentiometer the slide of which is associated with the orientation motion of the torch, and to which a voltage is applied proportional to the welding current, as well as to the resultant welding speed, for making the angle correction independent of these two factors, the output voltage of this differential amplifier being applied for controlling the speed of the torch tilting motor, the tilting taking place about an axis which passes through the point of impact of the arc on the weldpiece.

The machine according to the invention may conveniently be provided with a switching device for reversing, simultaneously, according to whether the point where the welding is effected, is above or below the axis of rotation of the work, the direction of the torch tilt, the connection of the angular position potentiometer and that of the radius correcting potentiometer.

For the welding of joints having any skew pattern whatsoever, on a workpiece rotating about any axis, the machine according to the invention comprises, in addition to the elements already listed, means for measuring the warping of the weld line and an additional potentiometer for angular correction connected in series, preferably through an impedance lowering amplifier, between the slide of the first potentiometer of angular correction and the input to an amplifier controlling the speed of a transverse travel motor which propels the torch parallel with the axis of translation of the joint, the slide of this additional potentiometer being driven in such a manner as to reproduce constantly the angle of the joint translation vector with the resultant vector of the torch motion.

According to a further feature of the invention, the machine, in its various embodiments just considered will be provided, advantageously with delaying means:

(A) For successively causing, from the instant the arc is struck, the starting of the travel motion, the filler wire feed, the energizing of the arc length control device, and of the device for tilting the torch-carrying arm.

(B) For interrupting, after a predetermined delay, following the stop of the filler wire feed, the other above operations.

The time interval between starting of the arc and the setting in motion of the workpiece shall preferably be determined automatically as an inversely proportional function of the welding current, so as to control the preheating of the welding pool.

Finally, according to a particular embodiment of the invention, in which the torch is stationary, and the part to be welded along any plane contour rotates under the torch, the machine is characterized in that it includes, for moving the workpiece while maintaining the melt pool constantly horizontal:

(a) A fixed horizontal pivot the geometrical axis of which goes through the melt pool;

(b) An arm, driven in rotation about said axis by a first motor and varying in length under the control of a second motor;

(c) A shaft carrying the workpiece, said shaft being supported by the extensible arm, so as to remain constantly parallel with the axis of the fixed pivot, and driven in rotation with respect to the extensible arm by a third motor.

(d) Electrical means on the same principle as those described above in connection with the welding of non circular joints, for constantly maintaining a constant arc length while preserving the perpendicularity between the torch and the melt pool as well as for maintaining a constant speed of the melt pool by acting on the respective speeds of the three motors mentioned above under (b) and (c).

The invention will be described in greater detail hereinafter with reference to the appended drawing given by way of non limitative example and wherein.

Figure 1:
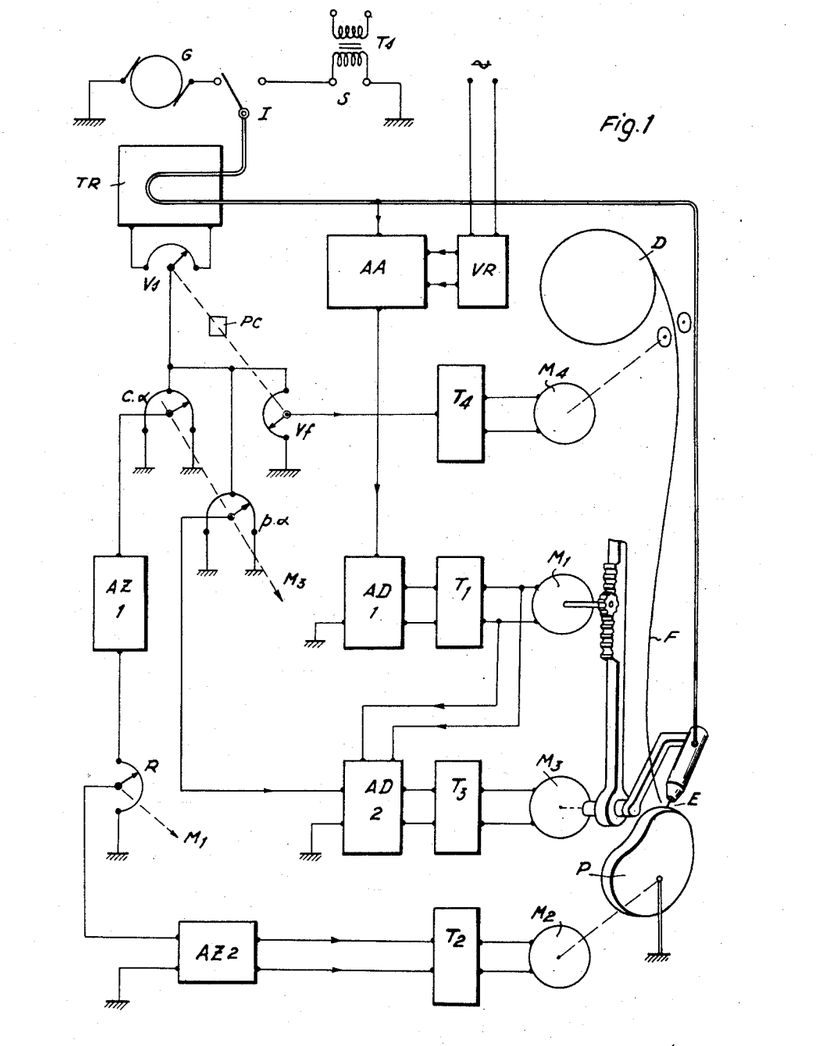
Figure 1 is an assembly diagram of a machine in accordance with the invention for welding with a filler wire along an irregular plane contour on a rotating workpiece.
Figures 2, 3:
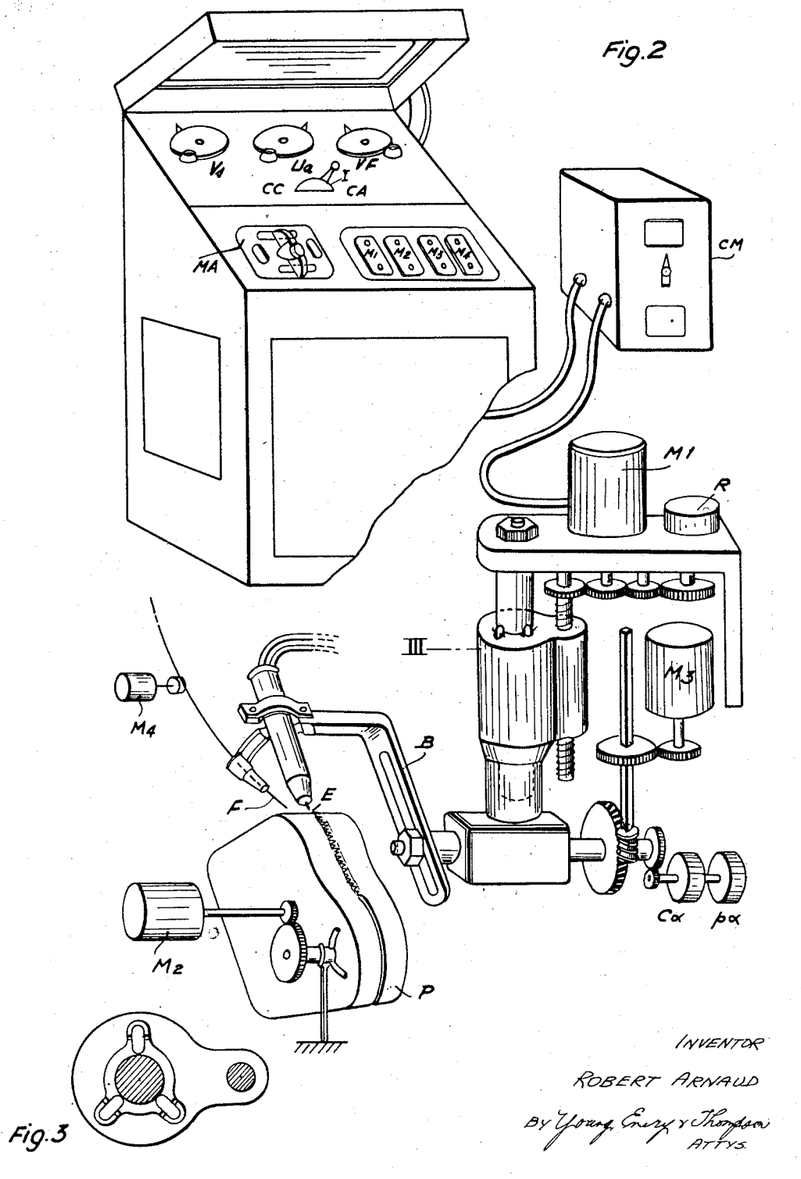
Figure 2 is a diagrammatic view, in perspective, of the welding head and of the control desk constituting the main elements of the machine of Figure 1.
Figure 3 is a sectional view of the vertical guide of the head of Figure 2, along III—III.

In Figures 1 and 2 there are shown, at $M_1$, $M_2$, $M_3$ and $M_4$ the motors which control respectively, the upward and downward motions of the torch 2, the rotation of the workpiece P, the torch tilt and the feed of the filler wire F. These four motors are energized, respectively, by the thyratron circuits $T_1$, $T_2$, $T_3$ and $T_4$ represented in Figure 1. A change-over switch I shown at the center of the control desk, in Figure 2 makes it possible to switch certain circuits according to whether the welding is to be carried out with D.C. or A.C. This switching will be described and explained farther. In addition, a switching box CM, Figure 2, makes it possible to reverse certain controls according to whether the place where the welding is effected is above or below the axis of rotation of the workpiece P.

Figure 8:
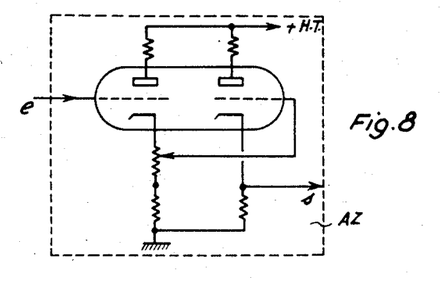
Figure 8 is a diagram of an impedance lowering circuit which is also part of the assembly of Figure 1.
Figure 14:
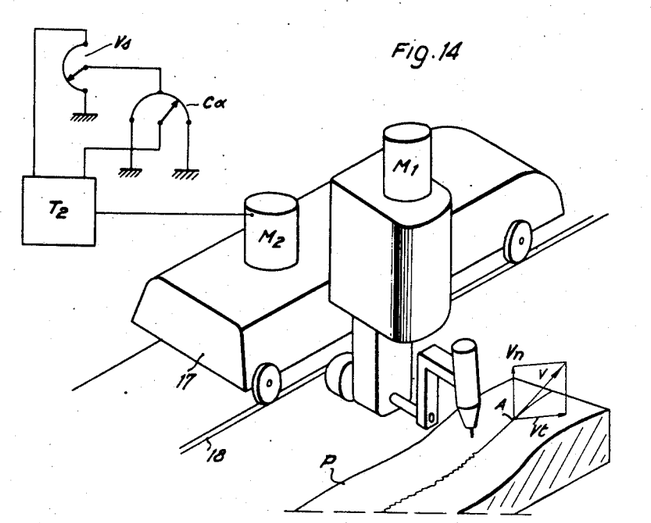
Figure 14 is a diagram similar to that of Figure 9 but in which the object to be welded along any plane contour is stationary and the torch is carried by a carriage, the travel speed of which is automatically controlled so as to hold the resultant welding speed constant.

There have also been represented, diagrammatically, in Figure 1 the transducer TR designed for measuring the welding current and for delivering to a potentiometer Vs a voltage proportional to that current. In the case of A.C. welding, the windings of this transducer are switched by the general change-over switch I so as to constitute a current transformer. This feature will be considered in connection with Figure 7. The potentiometer Vs is used for adjusting the welding speed and its output voltage is distributed, preferably by means of a transformer provided with independant secondary windings, not shown, over three circuits:

(1) A first circuit comprising a potentiometer for angular correction $c.\alpha$, followed, through a first impedance lowering circuit $AZ_1$ by a radius correcting potentiometer R which is itself connected through a second impedance lowering circuit $AZ_2$ with the thyratron $T_2$ energizing the motor $M_2$ which drives either the workpiece as represented in Figure 1 or the torch carriage as represented in Figure 14. The diagram of an impedance lowering circuit is represented in Figure 8.

(2) A second circuit comprising a potentiometer $V_f$ adjusting the filler wire feed rate, connected with the thyratron $T_4$ which energizes the wire feed motor $M_4$.

(3) A third circuit comprising a potentiometer, hereinafter called the "angular position" potentiometer, designated by the reference numeral $p.\alpha$, and connected with a differential amplifier $AD_2$ controlling the orientation motor $M_3$ through the thyratron $T_3$. This potentiometer measures the effective torch tilt. The operation of the amplifier shall be explained hereinafter. There are also shown in Figure 1 the arc voltage analyzer AA, the detailed diagram of which is given in Figure 4 and the source of stabilized D.C. voltage VR delivering the reference voltage to the analyzer. The latter is connected with a differential amplifier $AD_1$ which controls the lifting motor $M_1$ through the thyratron circuit $T_1$. The armature voltage of the motor $M_1$ is applied, further, to the differential amplifier $AD_2$ mentioned above and which is part of the control circuit for the orientation or tilt of the torch by means of the motor $M_3$. The operation of this orientation control circuit will be set forth in detail later.

The mechanical structure of the machine according to the invention also offers some novel features which are represented chiefly in Figure 2, particularly as regards the vertical guiding of the mobile portion of the welding head. The mobile assembly is guided by two groups of three ball races, represented in Figure 3 about a tubular guide. Limit switches are provided for cutting off the current supply so as to prevent the electrode from dipping into the welding pool.

The control cabinet comprises a desk on which are grouped all the controls, except the welding location switch CM which has been mentioned above and which is arranged in the immediate vicinity of the welding head. The desk itself is divided into two parts, the upper portion containing the main controls is provided with a cover with a glass pane which may be locked after the adjustments have been set for a predetermined series of welding operations. These adjustments are those of the welding speed V, by means of the potentiometer Vs in Figure 1, of the arc voltage Ua by means of the potentiometer 9 of Figure 4, which controls the fixed voltage with which the actual arc voltage will be compared by the analyzer AA, and the wire feed rate by means of the potentiometer Vf located on the right hand side of the board. Underneath these three dials Vs, Ua and Vf is the general change-over switch I making it possible to pass immediately from the use of direct current to that of alternating current.

The lower portion of the panel contains a general on and off switch MA and four pairs of push-buttons for the manual control of the four motors $M_1$–$M_4$.

The cabinet contains the various amplifiers and circuits represented in Figure 1 as well as their power-supply circuits energized from the mains. It may further be provided with a separate enclosure for mechanical tools and spare parts. Of course, the apparatus also comprises the solenoid valves for argon and for the torch cooling water, as well as their control circuits. These elements are conventional and have not been represented.

Figure 4:
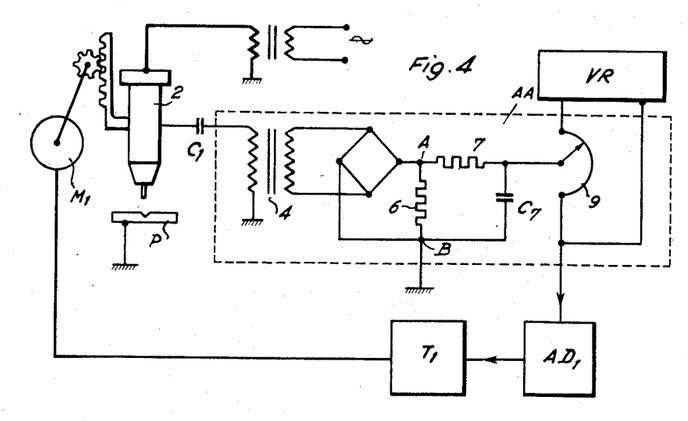
Figure 4 is a diagram of the circuit for the automatic control of the arc voltage which is part of the assembly shown in Figure 1.

Figure 4 represents the arc voltage control circuit, and more particularly the arc voltage analyzer represented in a general manner with the reference AA in Figure 1.

This circuit will first be examined assuming that the electrode E of the torch is energized with alternating current. The voltage of electrode E is applied, through a condenser 3, for eliminating all D.C. components, to the primary of a transformer 4, the secondary output of which is applied, through a rectifier bridge 5 to a resistance 6. Across the terminals A and B of this resistance a rectified voltage is available, proportional to the arc voltage, taking into account half waves of both polarities. This voltage across A and B is applied to an integrating network consisting of a resistance $R_7$ and a condenser $C_7$. This network produces a mean value of the integrals of the areas on the voltage curves. This mean voltage taken across the terminals of condenser $C_7$ is then compared with a stabilized reference voltage, supplied by the source VR to a potentiometer 9 which makes it possible to adjust the arc voltage to a predetermined value. The output voltage from this potentiometer, which, therefore, depends on the arc voltage and on the position of the slide is applied to the differential amplifier $AD_1$, which, in turn, controls the thyratron $T_1$ which energizes the motor $M_1$ for raising or lowering the torch.

Figure 5:
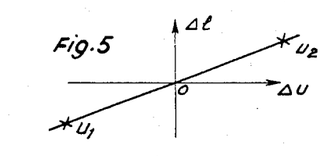
Figures 5 and 6 are two diagrams illustrating the principle of the stabilization device applicable to the circuit of Figure 4, for avoiding "hunting"
Figure 6:
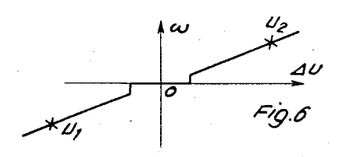

The operation of the differential amplifier, represented diagrammatically in Figures 5 and 6 is as follows: assuming that the voltage U of the arc, varies in the course of time from a value $U_1$ to a value $U_2$, while the reference voltage is set at zero by the amplifier, from $U_1$ to O, U being less than the reference voltage, the amplifier will cause the torch to rise. Then, near the reference value it stops the motor and holds it braked, by shorting the armature through a resistance and by leaving the field winding energized. From O to $U_2$, so long as the voltage does not vary outside a predetermined bracket, adjustable by a potentiometer, not shown, the motor remains blocked. Subsequently, a relay operates for lowering the torch into the braking zone. The purpose of this arrangement is to remove all risks of hunting which would cause the torch to oscillate indefinitely about the adjustment point.

It should be noted that the voltage applied to the armature of the motor for causing the torch to rise or to move downwards is always proportional to the voltage difference existing between the arc voltage and the reference voltage; the more the arc length differs from the length chosen, the higher the speed for bringing the torch back to the chosen position. It should also be noted that this coefficient of proportionality may be adjusted.

In the case of D.C. welding a switching device, preferably controlled by the general change-over switch I makes it possible to connect the voltage of the torch current to the point A of the resistance 6.

As regards the automatic arc voltage regulation device it will be noted that the motor $M_1$ may be controlled manually when the arc is not operating, by means of the push buttons on the desk of Figure 2. To this effect a separate power supply has been provided for energizing the armature with a rectified current. The polarity determines the direction of operation of the motor. The rest position is a braked position. It should also be noted that the connection with the arc voltage on the torch is ensured only when the arc is on, by the use of a current relay which closes when the welding current flows. Similarly, the manual controls by push buttons, of the up and down motions of the torch are put out of circuit as soon as the arc has been started. This device in addition to safety considerations, allows an easy starting of the arc. The electrode being first energized, the "down" button is depressed; as soon as the electrode touches the part to be welded, the welding current flows, the "down" button is put out of circuit, and the automatic regulation apparatus starts operating.

Figure 7:
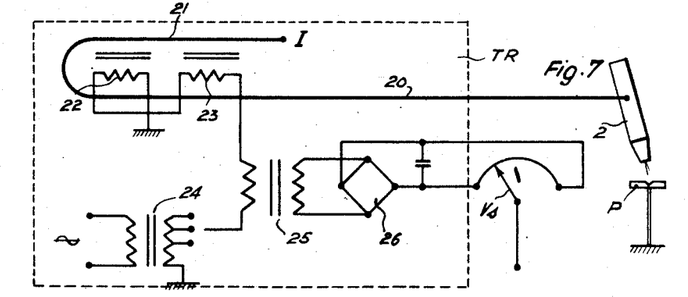
Figure 7 is a diagram of the circuit for measuring the current, which is part of the assembly in Figure 1.

Referring to Figure 7 which represents the device for delivering a voltage proportional to the welding current, 20 indicates the welding cable supplying the current to the torch. This cable forms a loop 21, which is coupled magnetically with the two windings 22 and 23 of the transducer. These two windings may be connected in parallel or in series according to whether the welding is carried out with D.C. or with A.C. For D.C. operation, these two windings are energized through a transformer having adjustable taps 24, the primary of which is connected to the A.C. mains. A second transformer 25, the primary of which is inserted in series with the windings 22 and 23 of the transducer constitutes the output transformer. Its secondary voltage which is proportional to the welding current is rectified by a rectifier bridge 26 and applied to the two ends of the potentiometer Vs which controls the welding speed. This potentiometer is also represented in Figure 1. For A.C. operation, the primary of the energizing transformer 24 is disconnected and its secondary is shorted to the ground. The device is thus transformed into a current transformer. The welding current might also be measured at the terminals of a shunt, but the device according to the invention offers a much better stability. This device makes it possible to associate the "current" and "welding speed" factors in such a manner that when the first one is given, the second one results automatically whatever may be the fluctuations of the first during the welding operation. It thus provides an excellent solution to certain difficulties ordinarily found in automatic welding with a nonmelting electrode, protected by argon, and which are caused, in particular by the inaccuracy of the current settings of the generators and to the output instability due to the load variations on the power mains, to the variation of the arc characteristics and to the very construction of the generator.

It was thus necessary, heretofore, to carry out tests on a sample for adjusting the welding speed to the current value, since it is practically impossible, due to the inaccuracy of adjustment of the generator, to find twice the same current value. This drawback is such that automatic welding is used only for important works, although it ought to be used for carrying out all welded joints having a simple geometric line. On the other hand output variations cause irregularities in adjustment and lead to joints with uneven penetrations.

This consequence is particularly serious in the automatic welding of thin metal sheets for aviation, in which the constancy of penetration of the joints is an essential factor.

In the present invention, the hypothesis was assumed that the welding energy is directly proportional to the current value and to the relative speed of the torch with respect to the part to be welded. The ratio $I/V$ (current/welding speed) being chosen, any increase in current causes a proportional increase in the welding speed.

The operation of the device is effected as follows:

The workpiece being placed in position, the current output of the current generator is adjusted approximately and the potentiometer Vs is adjusted for the setting desired $I/V$.

It is possible also to simply pass the welding cable through a magnetic circuit, the saturation of which by the welding current determines a voltage proportional to the value of this current.

This voltage is used for controlling the speed of the motor $M_2$ which may either rotate the workpiece, in the manner shown in Figures 1 and 2 or drive the torch bearing carriage in a translation motion, in the manner show in Figure 14, in which the workpiece is stationary and the torch is attached to a movable carriage.

The voltage, proportional to the welding current, delivered by the transducer, may also be used for controlling the speed of the motor $M_4$ (Figure 1) feeding the filler wire. The result is that the amount of filler wire fed to the melt pool becomes proportional to the current, regardless of the fluctuations or inaccuracies in the current setting of the generator. It will be explained hereafter, in relation with the Figures 15, 16 and 17, how this automatic regulation is utilized for obtaining a constant penetration for the welded joint.

As indicated at the beginning, the potentiometer $Vs$ may be replaced by a variostat, which offers the advantage of giving a wider range of adjustment. It should also be noted that whatever the set position of the potentiometer or variostat $Vs$, the transducer or current transformer should be built in such a manner that the curve which represents its output voltage as a function of the welding current value be rectilinear and pass through the origin of the coordinates.

Figure 8 shows, by way of example, one of the impedance lowering circuits ($AZ_1$ and $AZ_2$, Figure 1) intended to improve the connection between two elements, for instance two potentiometers connected in series. This device comprises two triodes both operating with a cathode load. The voltage appearing on the cathode of the first triode is applied to the grid of the second one and the output voltage is taken from the cathode of the second triode. The device thus offers a high impedance input and a low impedance output, the voltage of which follows accurately the variations in the input voltage.

Figure 9:
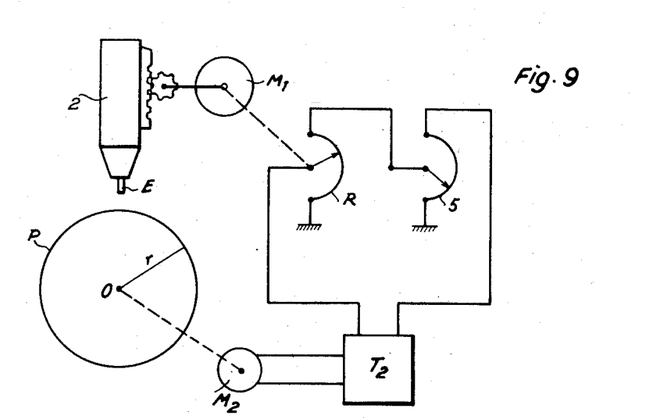
Figure 9 is a theoretical diagram of the device for regulating the angular speed of the workpiece as a function of its radius for maintaining a constant tangential speed when the radius varies.

Figure 9 gives a first example of the invention in application to the maintaining of a constant speed of the weld pool. Figure 9 shows a relatively simple application, that of the welding of a joint with a circular configuration. The workpiece P, having a radius $r$, rotates about its center O. In order to allow the successive welding of parts with various radii without having to change the settings of the machine, the latter is so arranged as to adapt its own settings. To that effect, the torch 2, which is guided on its support so as to be capable of moving towards or away from the workpiece, perpendicularly to its surface, drives the slide of a potentiometer R, inserted in the circuit which controls the motor $M_2$ for rotating the workpiece P about its axis. This potentiometer R is connected in series with a second potentiometer 5 enabling the operator to determine once for all, at the beginning of a series of operation, the speed to be held. This potentiometer 5 may be constituted, conveniently by the potentiometer $Vs$ of Figure 1 connected across the transducer output in such a manner that the welding speed be dependent both on the value of the welding current and on the radius of the joint to be welded. This welding speed being defined as the product of the angular velocity $\omega$ by the radius; the curve of the potentiometer R has been so calculated as to keep the product $\omega R$ constant, by varying $\omega$ in inverse proportion to R. This result is obtained by giving this potentiometer a hyperbolic curve which allows it to deliver an output voltage capable, when applied, after amplification, across the terminals of the armature of the motor $M_2$, of varying this speed in such a manner that the tangential speed $\omega R$ of the part remain constant when R varies. As a concrete example, assuming the minimum radius to be 10 cm., and the maximum radius to be 35 cm., the total resistance of the potentiometer R being 30,000 ohms, for instance, for the minimum radius of 10 cm., the speed of rotation should be maximum and consequently the potentiometer should offer the maximum resistance, i.e. 30,000 ohms for the said 10 cm. radius.

For the 35 cm. radius, the speed of rotation should be minimum, as well as the resistance which takes the value $$\rho_1 = 30,000 \frac{10}{35} = 8750 \text{ ohms}$$

for a 20 cm. radius:

$$\rho_2 = 30,000 \frac{10}{20} = 15,000 \text{ ohms}$$

This example shows that the invention achieves, by electric means, a device which is comparable with a mechanical differential, and, like it, capable of keeping the sum of the two speeds constant. It will be seen, referring to Figures 10 and 11 that the invention makes it possible, owing to the use of electronic circuits, very simple in themselves, to multiply the parameters constituting so many scalar quantities representing speed vectors for which the modulus of the constant sum is desired as a function of one of them.

Figure 10:
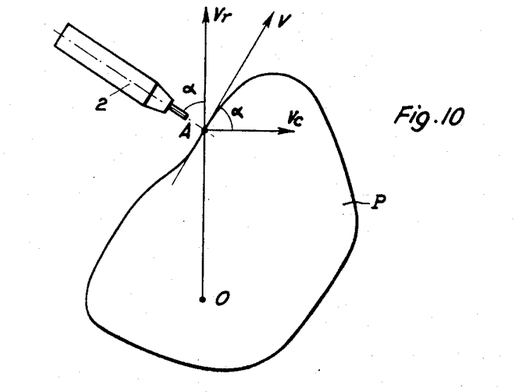
Figure 10 is a diagram showing the composition of the circular and radial speeds along a tangent to an irregular plane curve.
Figure 11:
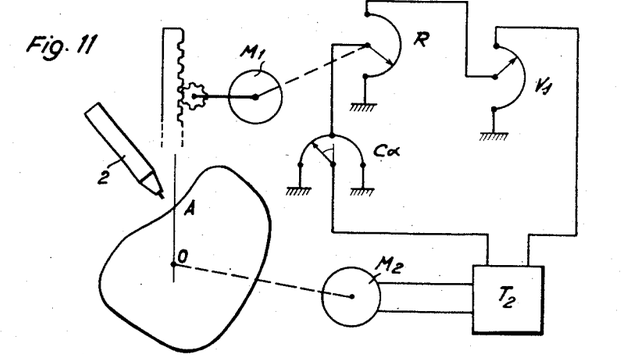
Figure 11 is a theoretical diagram of the device for maintaining the resultant speed constant, according to the diagram of Figure 10.

Referring first to the speed diagram of Figure 10, the workpiece P, having any plane contour, is shown rotating about any point O. Considering any point A on the periphery of the workpiece, it will be seen that the resultant speed V of this point, when the piece rotates about O, breaks up into two vectors; a radial vector $V_r$ along the radius OA and a circular vector $V_c$, perpendicular on the radius OA. The resultant vector V makes an angle $\alpha$ with the vector $V_c$. Drawing the normal NA on the resultant vector V, it will be seen that this normal also makes an angle equal to $\alpha$ with the radial vector $V_r$.

It will now be assumed that the sliding support for the torch 2 is aligned with the extended radius OA and that the torch may rotate on this support about an axis perpendicular to the plane of the drawing and going through A.

It will be noted in this case, that if the up and down motion of the torch support is controlled by an electric motor energized by a thyratron circuit, for instance, the speed of rotation of this motor and consequently the upward or downward speed of the torch, represented by the vector $V_r$ is proportional to the armature voltage. Since $V_r = V \sin \alpha$ the conclusion is that $\sin \alpha$ is proportional to the armature voltage. It will be shown, hereinafter, how this motion is applied both to the determination of a constant resultant speed of the melt pool and to the maintaining of a constant value for the angle $\alpha$.

As a first analysis, reference may be made to the case when the weldpiece is a revolution body, according to Figure 9. It has been seen from Figure 9, that a first potentiometer 5 makes it possible to choose the speed to be held, and that a second potentiometer R, associated with the up and down motions of the torch corrects the control voltage to the motor $M_2$ driving the workpiece, for obtaining a constant circular speed. It is this constant circular speed which is represented by the vector $V_c$ in Figure 10. For automatically maintaining a constant resultant speed at the surface of a non circular part with any contour, there is also effected a correction of $V_c$ for obtaining the resultant speed V which is related to $V_c$ through the relationship $$\frac{V_c}{V} = \cos \alpha$$

To that effect, the output voltage of the potentiometer R, which is proportional to the elongation, since the slide of that potentiometer is driven by the up and down motion of the welding held, along an extension of the radius OA, is applied to a second potentiometer $c.\alpha$, which is the potentiometer for angular correction. The slide of this potentiometer is associated with the orientation or tilting motion of the torch. Referring to Figure 2 it will be apparent that it may, for instance, be driven by the horizontal shaft of the tiltable torch support. A multiplying gear is interposed for increasing the accuracy of the setting. The winding of the potentiometer $c.\alpha$ has such a resistance that the quotient of the voltages measuring respectively the vectors $V_c$ and V, these voltages corresponding to motor speeds, be equal to $\cos \alpha$. This potentiometer winding should, therefore, be in accordance with the equation $$\frac{V_c}{V} = \cos \alpha$$

For a given value of $V_c$, there is set up between V and $\alpha$ (or between $R\alpha$, the resistance of the potentiometer and $\alpha$), a relationship which gives a curve having a parabolic and symmetrical shape with respect to the Rα axis.

Consequently, the output voltage of the first potentiometer R is brought to the mid point of the winding of the potentiometer c.α, which offers resistance values symmetrical on both sides. The mid point corresponds, in principle, to the vertical position of the torch.

Referring again to Figure 10, it has been seen that the vector $V_r$ representing the upward or downward speed of the torch is equal to $V \sin \alpha$. Supposing V to be constant, as is the case, in fact, when the machine is in operation, $V_r$ and $\sin \alpha$ are proportional quantities and a voltage proportional to $\sin \alpha$ is obtained across the armature terminals of the motor $M_1$ for up and down motion. It is this voltage which is used, according to a specially important feature of the invention, for holding the torch constantly perpendicular to the surface of the workpiece, and, consequently to the welding pool. To that effect, the armature voltage is applied to a differential amplifier $AD_2$ receiving, on the other hand, the output voltage from a potentiometer measuring the angular position $p.\alpha$, the slide of which is associated with the orientation motion of the torch.

At the input to this potentiometer, which measures the actual torch tilt, a voltage is applied, proportional to the welding current, as well as to the resultant welding speed, V, for making the angle correction independent of these two factors. The output voltage from the amplifier $AD_2$ is applied to the thyratron circuit $T_3$ controlling the speed of the orientation motor $M_3$. The assembly diagram of Figure 1 shows clearly how these various elements are connected together.

Figure 12:
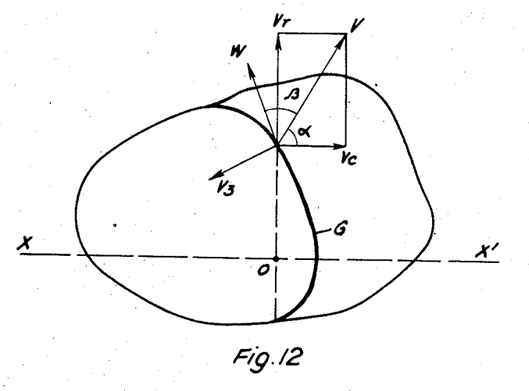
Figure 12 is a diagram similar to that of Figure 10 but for the case of a skew curve.
Figure 13:
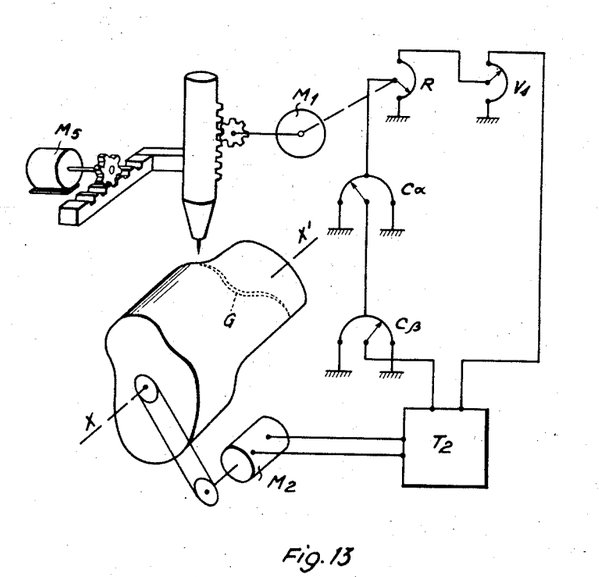
Figure 13 is a diagram which completes that of Figure 11 for welding along a skew line.

Figures 12 and 13 show how the principles used for ensuring the constant speed of the weld pool and for maintaining a constant angle between the torch and the melt pool, find an application, according to the invention, in the case of welding along a skew curve.

The diagram in Figure 12 shows a weldpiece P of any shape, rotating about a fixed axis XX', for being welded along a skew line G. If we consider a point A on this line, the projection of this point on the axis XX' is at a point O mobile along that axis. The instantaneous speed W of point A breaks up into three vectors: two vectors $V_r$ and $V_c$ in a plane perpendicular, on the axis XX' and a third vector $V_3$ parallel with said axis. The vectors $V_r$ and $V_c$ are composed two by two giving a partial resultant speed V. If we consider the angle $\beta$, formed by the speed vector W with the partial resultant V, we see that $$\frac{V}{W} = \cos \beta$$

According to the invention, an additional potentiometer $c.\beta$ is provided, the slide of which is actuated automatically by the variation of angle $\beta$ and the winding of which is so calculated that $$\frac{V}{W} = \cos \beta$$

The principle is exactly the same as that of the angle correction already achieved in the plane of the vectors $V_r$ and $V_c$ by the potentiometer $c.\alpha$. It is necessary, however, to determine at all instants the third coodinate of point A as a function of the two others. One may, for instance, use to that effect a mechanical device with a feeler and cam, or a magnetic indexing device, measuring the warping of the welding line, and which will control a motor having a speed proportional to its armature voltage.

Figure 14 shows, diagrammatically, an embodiment of the machine according to the invention, in which the workpiece P is stationary, and the torch 2 is carried by a carriage 17 movable in translation on a track 18. The part P is meant to be welded along a contour of any kind, contained in a vertical plane parallel to the rolling track 18. The problem is the same which has been studied in relation with Figures 10 and 12 above. Considering the point A where the welding is carried out at a given instant, the tangential speed V is the sum of $V_t$, the horizontal translation speed of the carriage and $V_n$, the normal speed, i.e. the upward or downward speed of the torch, for following the welding line. Calling α the angle of V with $V_t$, we see that $$\frac{V_t}{V} = \cos \alpha$$

The machine being provided, as already indicated, with a device which keeps constant the arc voltage, and consequently the arc length, the motor $M_1$, for the welding head, drives, as above, the slide of a potentiometer R which delivers a voltage proportional to the vector $V_n$. This voltage is used for adjusting the speed of the translation motor $M_2$ while an angular correction potentiometer $c.\alpha$ driven, as in the preceding example by the tilting motion of the torch, introduces the desired correction as a function of this motion. The tilting motor $M_3$ and its control circuit, have not been represented in Figure 14, having been described previously. The electrical diagram, therefore, is quite similar to that of Figure 11 and the operation is comparable in every point, except that the motor $M_2$ drives the carriage in translation instead of rotating the workpiece.

Figure 15:
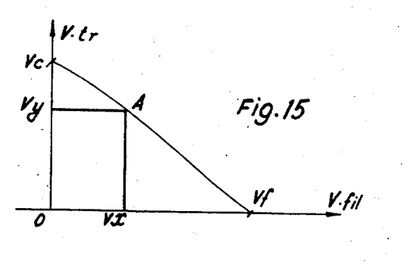
Figure 15 is a chart showing the data for constant penetration welding.
Figure 16:
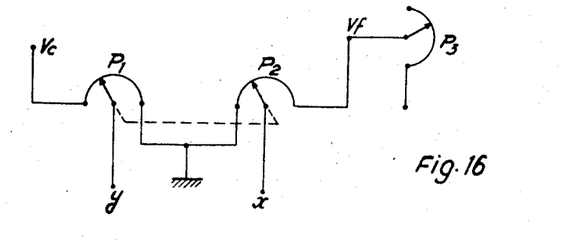
Figure 16 is a diagram of the electric circuit giving this constant penetration by a simultaneous and reversed control of the wire feed rate and of the welding speed.
Figure 17:
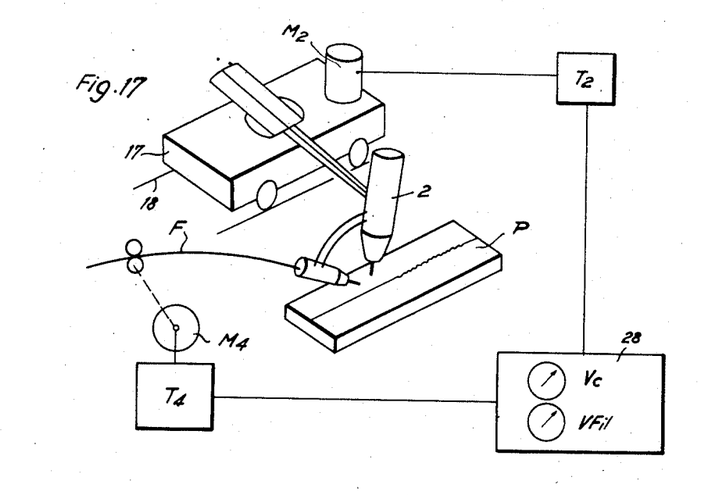
Figure 17 represents the application of the constant penetration device when welding with the torch on a carriage.

The problem of constant penetration welding will now be analysed with reference, more particularly, to Figures 15, 16 and 17, which illustrate the solution of this problem in accordance with the invention. It has been indicated, in connection with Figure 7, that the machine according to the invention is provided with a novel device for setting up a constant relationship between the welding speed and the welding current. The same device is used for solving the problem of constant penetration welding.

It is known, that in automatic welding with a non-consuming electrode and a filter wire, the edges to be welded must be adjusted with great precision. The appearance and quality of the bead vary according to the preparation of the edges. At the places where these are too far apart, a gap occurs in the weld pool. If, on the contrary, they are too close together the bead becomes swollen due to the excess of deposited metal.

The applicant tried to evaluate separately the energy necessary for melting the edges and that necessary for melting the filler wire and this led to the following two hypotheses:

(1) The welding energy per unit length is proportional to the welding current and inversely proportional to the welding speed. Thus the ratio: curent versus welding speed gives a good representation of the energy per unit length.

(2) For the same reasons, it may be assumed that the fusion rate of the filler wire and the energy necessary for melting this wire are directly proportional quantities. It may also be assumed that this energy per unit length is proportional to the current, or inversely proportional to the welding speed. Thus it is assumed that the speed of wire feed and the speed of welding have inversely proportional value.

The graphical representation of this principle is shown in the diagram of Figure 15. The speed of the rod feed is plotted on the axis of abscissae and the speed of the carriage on the ordinates axis.

For a zero speed of the wire, the carriage speed is maximum, it is $V_c$. For a zero speed of the carriage the speed of wire feed is maximum, it is $V_f$.

The equation of the straight line going through these two points is: $V_c x + V_f y - V_f . V_c = 0$.

A working point is represented at A with $x$ and $y$ as coordinates, $x$ being the wire feed rate and $y$ the carriage speed.

$V_c$, $V_f$ and $x$ being given, $y$ is obtained automatically.

The practical realization, illustrated by Figures 16 and 17 is as follows: The carriage and the rod feeding device are driven respectively by the motors $M_2$ and $M_4$ controlled by electronic regulators and the speeds of rotation of which are directly proportional to their armature voltages.

The values $V_c$, $V_f$, $x$ and $y$ may thus represent control voltages. Values are selected for:

(a) Voltage $V_c$ corresponding to the carriage speed for effecting a given weld with a given current I and no filler wire added, and (b) The voltage $V_f$, adjustable by means of a potentiometer $P_3$, representing the wire feed rate at which this wire may be entirely fused with the same current I.

Two ganged linear potentiometers $P_1$ and $P_2$ are provided, so that when $P_1$ is adjusted for $y=V_c$, $P_2$ gives a zero voltage for $x$ and conversely.

Consequently, by varying $P_1$ and $P_2$ together, point A follows the curve of Figure 15 and the above hypotheses being assumed, constant penetration is obtained.

The machine is provided with a self-propelling carriage 17 controlled by the thyratron circuit $T_2$.

This carriage supports the torch 2, provided with a nonmelting electrode E. The filler wire is brought in the vicinity of the arc by the motor $M_4$, controlled by the thyratron circuit $T_4$. The boxes $T_2$ and $T_4$ are connected through the control panel 28 comprising the $V_c$ adjustment knob and the filler wire feed rate adjustment knob.

The operator places the wire feed control knob at any position and adjusts $V_c$ for the penetration to be as in the above case (zero wire speed). The $V_c$ control knob is thereafter left as it is. The operator may, then, without any damage, rotate the wire speed knob as needed.

The operations may be further facilitated by automatically determining $V_c$ by the device which maintains a constant relationship between welding speed and current. This device has already been described in connection with Figure 7. In this case, the setting becomes independent of the current and the panel 28 (Figure 17) is then simply calibrated according to the dimensions and nature of the welding rod; for instance Stainless wire 12/10  Light alloy wire 12/10
Stainless wire 15/10  Light alloy wire 15/10
Stainless wire 20/10  Light alloy wire 20/10

Referring to Figure 1, it will be noted that the device which achieves constant penetration has been represented by the slides of the two potentiometers $V_s$ and $V_f$. This illustrates the simplicity of the solution brought by the invention to the problem of constant penetration welding, by simply coupling two potentiometers, in the indicated manner.

Figure 18:
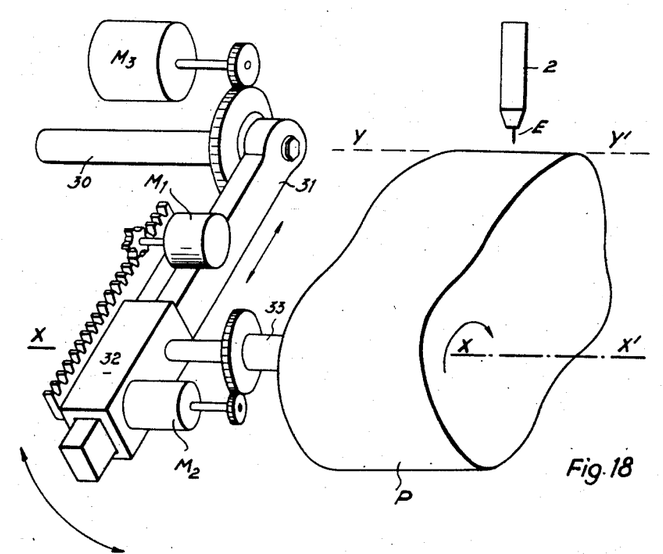
Figure 18 is a diagram, in perspective, of an embodiment of the invention for keeping the melted pool constantly horizontal.

Figure 18 represents an embodiment of the machine according to the invention, for maintaining the welding pool constantly horizontal.

The welding head, supporting the torch 2 is stationary and the workpiece P is mobile about two parallel axes, XX' and YY'. The XX' axis is the workpiece axis of rotation proper, while the YY' axis is fixed in space and passes through the melt pool. The orientation of the axis XX' with respect to the fixed axis YY' as well as its distance therefrom are variable so as:

(1) To keep a constant arc length by the action of a device which varies the distance XX'—YY'.

(2) To keep the position of the melt pool constantly horizontal by the action of a device varying the orientation of the XX' axis with respect to YY'.

In the drawing, the fixed axis YY' is materialized by a pivot 30 on which an arm 31 rotates. This arm carries a slide block 32, supporting an axis 33 parallel with the fixed pivot 30. This axle 33 constitutes the axis of rotation XX' for the part. A motor $M_1$, supported by the arm 31 moves the slide block along the arm, while a motor $M_2$ rotates the axle 33 and consequently rotates the workpiece about the axle XX'. A third motor $M_3$, which is stationary, in the vicinity of the pivot 30, rotates the arm 31 on the pivot 30.

It may be seen easily that the respective functions of the motors $M_1$, $M_2$ and $M_3$ are the same which these motors ensure already, for instance, in the diagram of Figure 1, and that these motors may be controlled by the same circuits already described.

The mechanical structure represented in Figure 18 is given by way of example only and the mechanism will be, preferably, realized symmetrically, i.e. by arranging, on the right hand side of the workpiece, a second arm symmetrical of the arm 31, and rotating and varying in length in synchronism therewith. According to a preferred embodiment, the motor $M_3$ controls the variation in length of the extensible arms by means of hydraulic jacks incorporated in these arms.

The above examples show that the machine according to the invention is capable of the most varied applications. These are made possible by the fact that the arc itself acts as a feeler by its automatic voltage regulation for determining at all instants the position of the torch and its upward or downward speed. The adjustment of the three dials of the control desk represented in Figure 2 and controlling respectively The welding speed, proportional to the factor $I/V$
The arc voltage
The filler wire feed rate, also proportional to $I/V$ determines all the operating conditions for automatic welding and no touching up of the settings is required. The buttons for manual control for the motors $M_1$–$M_4$ at the bottom right hand side of the desk are automatically put out of circuit as soon as the arc starts. It will be possible and advantageous to provide the operator with an adjustment chart with several columns, indicating for each workpiece thickness the arc voltage, the welding speed and the wire speed recommended.

The starting of the arc initiates, in an absolutely automatic manner the following cycle of operations:

Pre-heating of the melt pool which makes it possible to wait until the arc is stabilized.

The initiation of some of the automatic operations; workpiece travel and filler wire feed.

Regulation of the arc length; its delayed initiation makes it possible to wait until the arc strikes on a newly reached zone and not on a pre-heated zone, the emissive power of which has decreased.

Tilt of the torch position arm; its delayed initiation makes it possible to wait until the arc length is well stabilized.

The whole cycle does not last more than 2 or 3 seconds. It is the stopping of the wire feed, preceding the extinguishing of the arc which controls the stopping of the whole automatic operation. This prevents sticking the end of the filler wire in the melt pool at the end of the operation.

Since the stability of the arc has a great importance for the automatic regulation of the arc length, which in turn, controls all the other operations, it is recommended, for A.C. welding in argon, to use a battery of condensers in series with the power supply. The choice of the electrodes is important also, and it is recommended, for D.C. welding in argon, to choose an electrode of thoriated tungsten. The present state of the technique makes it possible to obtain easily a degree of stability of the arc which will be acceptable for a good operation of the machine according to the invention.

The user will also find an advantage in choosing a carefully built welding support, well designed for its function which is to oppose the thermal deformation of the edges of the joint, to prevent the oxidizing at the back of the welding bead and to prevent the collapsing of the melt pool.

Among the advantages of the invention, mention will be made of:

The rapidity of work preparation, which makes it possible to pass with no loss of time from a limited job to mass production.

The invention is particularly advantageous in this respect since it is sufficient to adjust three dials, a change-over switch and to set approximately the welding current.

The fidelity of the settings in time owing to an ample use of electronic elements which are not affected by wear.

The tilting torch arm achieves with precision what was attempted heretofore with a more or less cut and try method by the best operators welding by hand, to keep the linear energy constant, to feed the welding wire in a uniform manner and to keep the torch at a constant angle with respect to the workpiece.

Finally it may be mentioned that the main features of the invention which has been described here essentially in its application to argon welding, with a non-melting electrode and a filler wire, are also applicable, as will appear to welding technicians, to consumable electrode argon welding, and to submerged arc welding. Some of these features, in particular that which consists in using the armature voltage of the torch raising motor for translating into an electrical quantity the motions of the tool actuated by this motor are capable of applications in other fields than welding, in particular in machine tools. The function of a detecting element fulfilled by the electric arc in the above examples could also be fulfilled, by a mechanical feeler, a capacitive head or other similar measuring device.

What I claim is:

1. In an arc welding apparatus of the non-consumable electrode type, in combination, means for causing the travel speed of the electrode relatively to the workpiece to vary in direct proportion of the welding current and means for controlling the feed rate of a filler wire as a reciprocal of said travel speed.

2. In an arc welding apparatus of the non-consumable electrode type, in combination, means for maintaining a predetermined factor of proportionality between the travel speed of the electrode relatively to the workpiece and the welding current for controlling said travel speed, means for maintaining a predetermined reciprocal factor of proportionality between the feed rate of a filler wire and said travel speed, for controlling said feed rate and means for simultaneously adjusting both said factors inversely to one another.

3. In an arc welding apparatus of the non-consumable electrode type, welding current measuring means responsive to the intensity of the welding current for delivering a voltage signal proportional to said current, workpiece travel speed control means, filler wire feed rate control means, a first linear potentiometer adapted for delivering a first adjustable fraction of said signal to said travel speed control means, and a second linear potentiometer adapted for delivering a second adjustable fraction of said signal to said wire feed control means, said potentiometers being ganged inversely so as to cause said fractions of said signal to vary reciprocally.

4. In an arc welding apparatus of the non-consumable electrode type, in combination, means for adjusting the travel speed of the electrode relatively to a workpiece and means for adjusting the feed rate of a filler wire, said means being conjugated so as to cause said wire feed rate to vary inversely to said travel speed.

References Cited in the file of this patent

UNITED STATES PATENTS

| | | |
|---|---|---|
| Re. 15,313 | Morton | Mar. 21, 1922 |
| 1,506,374 | Lincoln | Aug. 26, 1924 |
| 1,536,774 | Clarkson | May 5, 1925 |
| 1,662,369 | Kjekstad | Mar. 13, 1928 |
| 1,809,653 | Wagner et al. | June 9, 1931 |
| 1,957,489 | Comstock | May 8, 1934 |
| 2,151,378 | Elsey et al. | Mar. 21, 1939 |
| 2,303,720 | Berkeley | Dec. 1, 1942 |
| 2,305,163 | House | Dec. 15, 1942 |
| 2,360,160 | Pickhaver | Oct. 10, 1944 |
| 2,469,790 | Schmerber | May 10, 1949 |
| 2,545,284 | Jones | Mar. 13, 1951 |
| 2,671,843 | Steele | Mar. 9, 1954 |

FOREIGN PATENTS

| | | |
|---|---|---|
| 141,118 | Austria | Mar. 25, 1935 |
| 439,900 | Great Britain | Dec. 17, 1935 |
| 511,591 | Great Britain | Nov. 15, 1937 |
| 897,745 | Germany | Nov. 23, 1953 |